United States Patent [19]

Keyes, IV et al.

[11] Patent Number: 4,511,882
[45] Date of Patent: Apr. 16, 1985

[54] FUNCTION GENERATOR

[75] Inventors: Marion A. Keyes, IV, Chagrin Falls; William L. Thompson, Chardon, both of Ohio

[73] Assignee: The Babcock & Wilcox Company, New Orleans, La.

[21] Appl. No.: 394,563

[22] Filed: Jul. 2, 1982

[51] Int. Cl.³ .......................................... H03K 13/24
[52] U.S. Cl. .............................. 340/347 DD; 364/723; 364/607; 364/853
[58] Field of Search ............... 364/722, 723, 607, 608, 364/853; 340/347 AD, 347 DD, 347 DA

[56] References Cited

U.S. PATENT DOCUMENTS 4,001,565 1/1977 Kawai .................................. 364/723
4,231,097 10/1980 Shibayama ......................... 304/723

OTHER PUBLICATIONS

Scott, "IBM Technical Disclosure Bulletin", vol. 18, No. 1, Jun. 1975, pp. 127–130.

Primary Examiner—Charles D. Miller
Attorney, Agent, or Firm—Vytas R. Matas; Robert J. Edwards

[57] ABSTRACT

A function generator producing an output signal varying in predetermined non-linear relationship to an input signal wherein the input signal addresses a programmable read-only memory (PROM) which is programmed to produce readout signals linearly proportional to selected values of the input signal and readout signals corresponding to the predetermined non-linear function of the input signal at said selected values and the output signal is derived by interpolation between the consecutive selected input signals which bracket the input signal.

3 Claims, 2 Drawing Figures

FUNCTION GENERATOR

This invention relates to a function generator producing an output signal corresponding to a predetermined non-linear function of an input signal.

In accordance with this invention a digital input signal addresses a programmable read-only memory (PROM) programmed to generate digital output signals corresponding to the predetermined function derived from preselected values of the input signal and the value of the output signal is determined by interpolation between the two preselected values of this input signal which bracket the input signal. In this implementation the required PROM programs are materially reduced over function generators wherein there must be stored in a PROM, such as illustrated and described in U.S. Pat. No. 3,164,807, the output signals for approximately each and every value of the input signal to obtain comparable accuracy.

IN THE DRAWINGS

DETAILED DESCRIPTION

Figure 1:
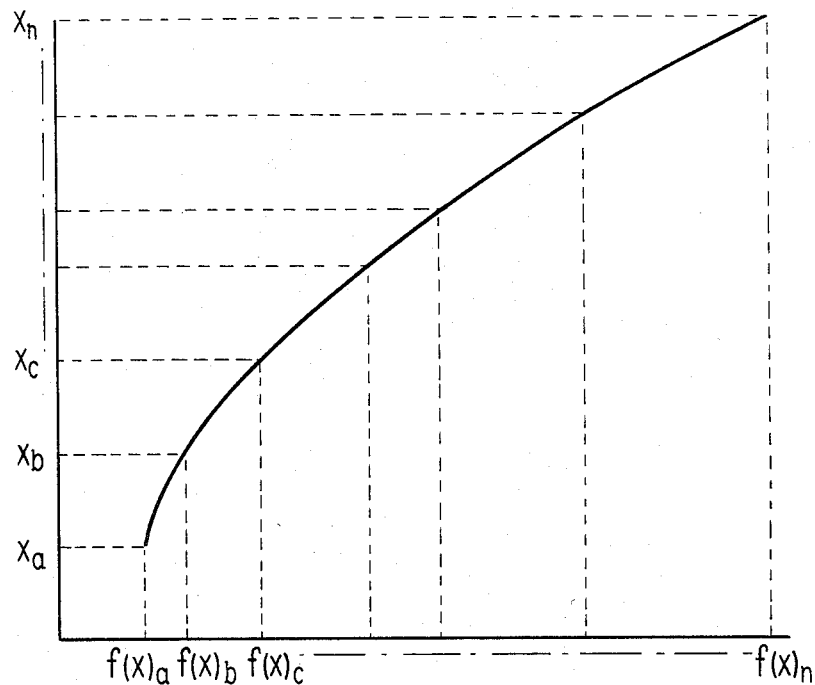
FIG. 1 is a plot of a non-linear curve, $f(X) = X^2$, useful in explaining the principles of this invention.
Figure 2:
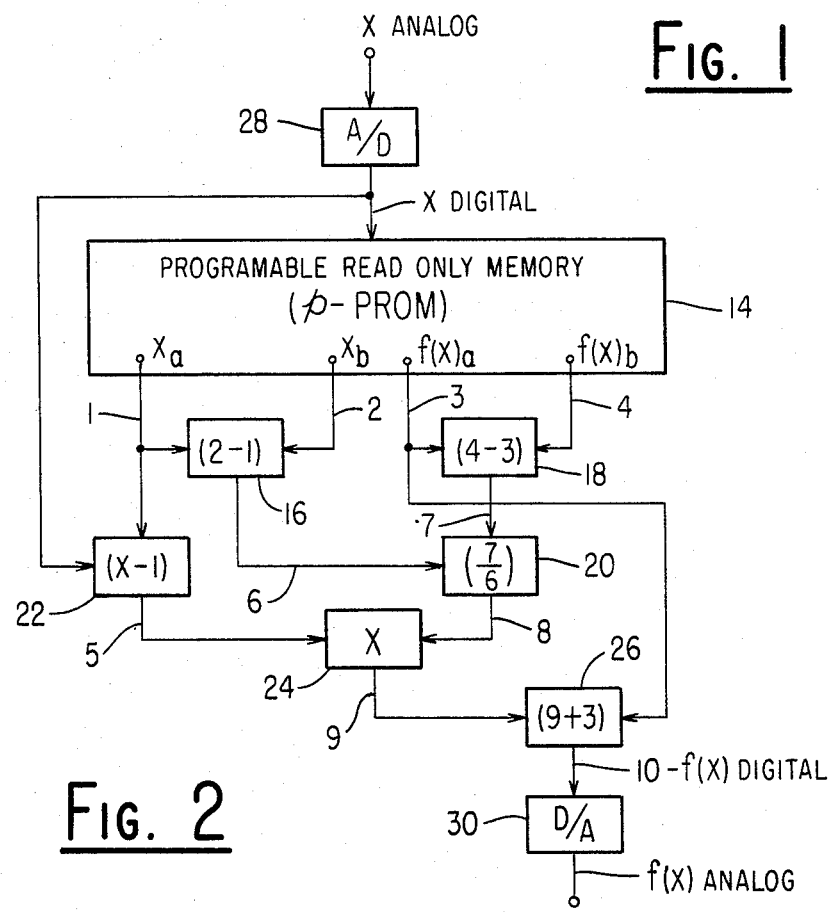
FIG. 2 is a block diagram of a function generator embodying the principles of this invention.

Referring now to the drawings, there is graphically shown in FIG. 1 an arbitrarily chosen non-linear function between an independent input digital signal (X) and the resultant dependent digital signal f(X). In accordance with this invention selected values of the independent input signal $X_a$, $X_b$, $X_c$–$X_n$ and the resulting values of the dependent signal $f(X)_a$, $f(X)_b$, $f(X)_c$–$f(X)_n$ are programmed in a PROM 14 (FIG. 2). The number and spacing of the selected values of the independent signal can be varied in accordance with the degree of accuracy required, it being recognized that each increase in selected values of the input signal require a corresponding increase in the PROM memory capacity.

Assume, for example, the input signal (X) has a value intermediate to the selected values $X_a$ and $X_b$. Generated in the PROM 14 would be readout signals corresponding in value to $X_a$, $X_b$, $f(X)_a$ and $f(X)_b$ identified in the drawing as signals 1, 2, 3, and 4. From these signals, by means hereinafter described, an output signal corresponding to f(X) is derived from the interpolating equation:

$$f(X) = f(X)_a + (X - X_a)\left[\frac{f(X)_b - f(X)_a}{X_b - X_a}\right] \quad (1)$$

By means of a subtraction unit 16, receiving the readout signals 1 and 2, an output signal 6 is generated corresponding to the difference between $X_b$ and $X_a$. By means of a subtraction unit 18 receiving output signals 3 and 4 there is generated an output signal 7 corresponding to the difference between $f(X)_b$ and $f(X)_a$. By means of a dividing unit 20, receiving output signals 6 and 7, there is generated an output signal 8 corresponding to the quotient of:

$$\left[\frac{f(X)_b - f(X)_a}{X_b - X_a}\right] = K_1 \quad (2)$$

As indicated the quotient of (2) is a constant $K_1$ so long as the value of (X) remains between the limits $(X)_a$ and $(X)_b$, accordingly, if desired, the constant $K_1$ can be programmed into the PROM 14.

By means of a subtraction unit 20, receiving the signal (X) an output signal 1, there is generated an output signal 5 corresponding to the difference between X and $X_a$. By means of a multiplying unit 24 receiving output signals 5 and 8 there is generated an output signal 9 corresponding to the product of:

$$(X - X_a) K_1 \quad (3)$$

By means of a summing unit 24 receiving output signals 3 and 9, an output signal 10 is generated corresponding in value of f(X) within the limits $X_a$ and $X_b$.

Upon the independent input signal (X) going beyond the limits $X_a$ and $X_b$ as, for example, increasing in value to fall between the limits $X_b$ and $X_c$, then the PROM 14 would, as programmed, generate output signals $X_b$, $X_c$, $f(X)_b$ and $f(X)_c$ in place of $X_a$, $X_b$, $f(X)_a$, $f(X)_b$. The mathematical computations to drive the output signal f(X) within the limits $X_b$ and $X_c$ would remain as detailed above. A constant $K_2$, satisfying equation (2) could, if desired, be programmed into the PROM 14 as heretofore described for the constant $K_1$.

As evident to those skilled in the art the digital function generator, as described, can readily convert to an analog function generator by the inclusion of an analog to digital converter 28 converting an independent analog signal to a corresponding digital output signal and by the inclusion of a digital to analog converter 30 converting the output signal, f(X) to a corresponding analog output signal.

We claim:

1. A function generator producing a digital output signal varying in predetermined non-linear relationship to a digital input signal, comprising, a PROM receiving said digital input signal programmed to generate a first and a second readout signal corresponding to selected minimum and maximum values of said input respectively and third and fourth readout signals corresponding to the non-linear relationship between the input and output signals at said minimum and maximum values of said input signal respectively, means generating a fifth signal proportional to the difference between the input signal and said first signal, means generating a sixth signal proportional to the difference between said second and first signals, means generating a seventh signal proportional to the difference between said fourth and third signals, means generating an eighth signal proportional to the quotient of said sixth signal divided by said seventh signal, means generating a ninth signal proportional to the product of said fifth signal multiplied by said eighth signal, and means generating a tenth signal proportional to the sum of said third and ninth signals whereby said tenth signal varies in said non-linear relationship to said input signal and said PROM being programmed to generate said first, second, third, and fourth readout signals at a plurality of selected values of said input signal and including means selecting for readout the output signals generated by the two consecutive selected input signals, one having a value less than and the other having a value greater than said input signal to form said selected minimum and maximum values of said input signal.

2. A function generator as set forth in claim 1 further including an analog to digital converter reponsive to an analog input signal generating said digital input signal.

3. A function generator as set forth in claim 1 further including a digital to analog converter responsive to said digital output signal generating a proportional analog output signal.

* * * * *